US010895797B2

(12) United States Patent
Cavaliere et al.

(10) Patent No.: US 10,895,797 B2
(45) Date of Patent: Jan. 19, 2021

(54) LINE CODING FOR OPTICAL TRANSMISSION

(71) Applicant: Telefonaktiebolaget LM Ericsson (publ), Stockholm (SE)

(72) Inventors: Fabio Cavaliere, Pisa (IT); Enrico Forestieri, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 16/302,016

(22) PCT Filed: May 25, 2016

(86) PCT No.: PCT/EP2016/061827
§ 371 (c)(1),
(2) Date: Nov. 15, 2018

(87) PCT Pub. No.: WO2017/202464
PCT Pub. Date: Nov. 30, 2017

(65) Prior Publication Data
US 2019/0146303 A1 May 16, 2019

(51) Int. Cl.
*G02F 1/225* (2006.01)
*H04L 25/49* (2006.01)
(Continued)

(52) U.S. Cl.
CPC ........... *G02F 1/225* (2013.01); *H04B 10/505* (2013.01); *H04L 25/4917* (2013.01); *G02F 2001/212* (2013.01)

(58) Field of Classification Search
CPC . G02F 1/225; G02F 2001/212; H04B 10/505; H04L 25/4917
(Continued)

(56) References Cited

U.S. PATENT DOCUMENTS 6,917,312 B2 * 7/2005 Bessios ............... H04L 25/4917
341/56
7,620,116 B2 * 11/2009 Bessios ............... H04L 25/4917
341/58
2005/0099325 A1 5/2005 Bessios

FOREIGN PATENT DOCUMENTS

WO 02 061978 A1 8/2002

OTHER PUBLICATIONS

Feedback Balanced Code for Multilevel PCM Transmission by Hisashi Kaneko and Akira Sawai, Members of Central Research Laboratories, Nippon Electric Co., Ltd., Kawasaki; Electronics and Communications in Japan, vol. 52-A, No. 1 (XP-000760053)—1969.
(Continued)

*Primary Examiner* — Khai M Nguyen
(74) *Attorney, Agent, or Firm* — Sage Patent Group (57) ABSTRACT

Digital data (11) is encoded to a set of five line symbols for optical transmission. The line symbols have amplitude values of 0, ±A1, ±A2, where |A2|>|A1|. A first binary value maps to the line symbols 0 and ±A2 and a second binary value maps to the line symbols ±A1. The amplitude values of the line symbols can be in the ratio A1:A2=1:sqrt(2). At a receiver, the received signal is photodetected to generate an electrical signal which can represent a set of three possible received symbols (RS1, RS2, RS3). Digital data (26) is recovered from the received symbols by comparing the electrical signal with a first amplitude threshold (TH1) and a second amplitude threshold (TH2).

21 Claims, 9 Drawing Sheets

(51) Int. Cl.
*H04B 10/50* (2013.01)
*G02F 1/21* (2006.01)

(58) Field of Classification Search
USPC .............................. 341/56, 58; 375/242, 286
See application file for complete search history.

(56) References Cited

OTHER PUBLICATIONS

Novel Optical Line Codes Tolerant to Fiber Chromatic Dispersion by Enrico Forestieri and Giancarlo Prati; Journal of Lightwave Technology, vol. 19, No. 11—Nov. 2001.
International Search Report for International application No. PCT/EP2016/061827—dated Feb. 28, 2017.

* cited by examiner

LINE CODING FOR OPTICAL TRANSMISSION

PRIORITY

This nonprovisional application is a U.S. National Stage Filing under 35 U.S.C. § 371 of International Patent Application Serial No. PCT/EP2016/061827 filed May 25, 2016, and entitled "LINE CODING FOR OPTICAL TRANSMISSION which is hereby incorporated by reference in its entirety.

TECHNICAL FIELD

The present disclosure is generally related to line coding digital signals for transmission.

BACKGROUND

Coherent optical transceivers are widely used for transmission in Dense Wavelength Division Multiplexing (DWDM) optical systems at rates of 100 Gbit/s and beyond. Coherent optical transceivers offer advantages such as spectral efficiency (enabled by the use of high order modulation formats) and long haul uncompensated fiber distances (enabled by post-detection digital signal processing).

However, the cost of coherent optical transceivers makes them unsuitable for cost-sensitive network segments such as access and aggregation. New access technologies are increasing the traffic levels in access and aggregation networks segments, requiring higher optical channel capacities from 25 to 100 Gbit/s. There is a need for more cost-effective high speed optical transceivers.

A lower cost alternative to a coherent optical interface is a direct detection optical interface. Direct detection is widely used to provide 10 Gbit/s On Off Keying (OOK) optical channels. This technology is cheaper (e.g. by a factor of 5) but suffers from two main drawbacks: (i) reduced sensitivity and noise tolerance; (ii) poor tolerance to chromatic dispersion. The first issue can be solved by using optical amplification, or by splitting the optical channels into two sub-channels at two different wavelengths, or by splitting the optical channels into two orthogonal linear polarization states. The second issue requires either the use of devices to compensate for the chromatic dispersion (e.g. Dispersion Compensating Fiber (DCF) or Fiber Bragg Grating (FBG)), or the use of a spectrally efficient modulation technique. For whatever modulation format, the narrower the spectrum, the lower the chromatic dispersion penalty. A narrow spectrum can be achieved by use of a multi-level modulation format or line coding. However, when using multi-level formats, the resilience to chromatic dispersion is not improved as the increased number of levels counterbalances the improved spectral efficiency, due to the lower tolerance of multi-level formats to the noise.

Figure 1:
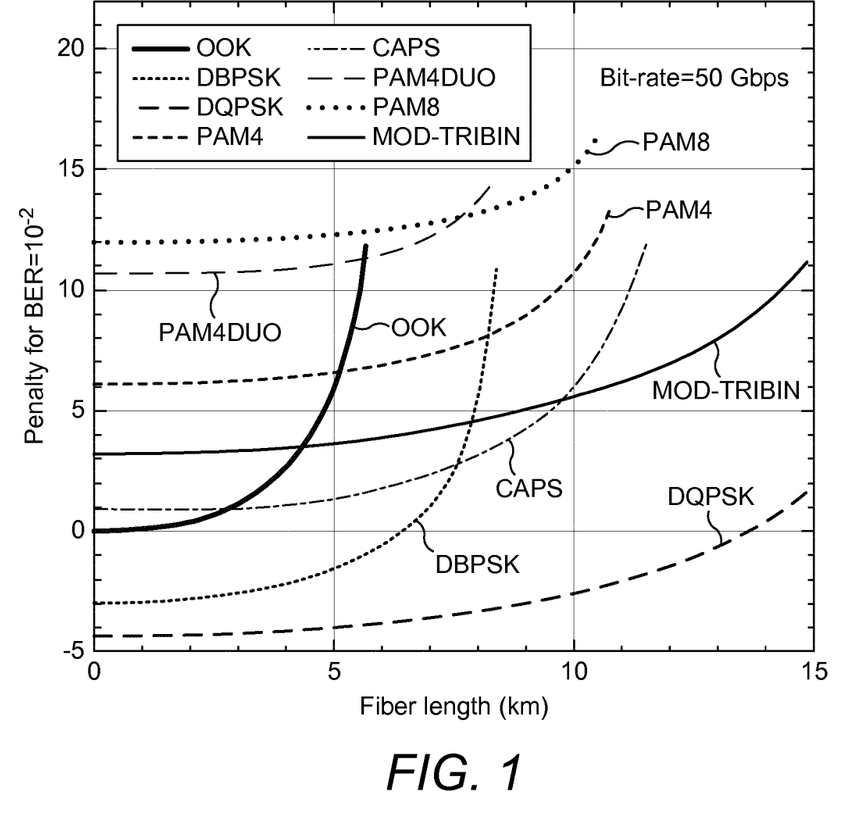
FIG. 1 shows a graph comparing performance of a range of modulation/line coding techniques.

FIG. 1 shows a graph of sensitivity penalty (with respect to OOK) versus fiber length (for a chromatic dispersion coefficient of 15.7 ps/nm/km) for a 50 Gbit/s channel for a range of modulation/line coding formats. Four level Pulse Amplitude Modulation (PAM4) is a four level modulation format standardised by The Institute of Electrical and Electronics Engineers (IEEE) in IEEE 802.3 for interconnection applications in the 1310 nm transmission window, where the fiber dispersion is negligible. At the transmitter, four amplitude levels are generated by a Digital to Analog converter (DAC) and, at the receiver, the received signal is discriminated by using three thresholds. The spectral width is about half that of an OOK signal at the same bit rate. From FIG. 1, it can be seen that PAM4 is more resilient to chromatic dispersion than OOK over longer fiber lengths, making longer fiber lengths achievable, although it has an initial sensitivity penalty of about 6 dB. FIG. 1 shows that fiber lengths of 10 km are hardly achievable without dispersion compensation (7.5 km of propagation in fiber lead to about 2 dB of dispersion penalty). Other formats shown in FIG. 1 are eight-level PAM (PAM8), Duobinary PAM4 (PAM4DUO), Differential Binary Phase Shift Keying (DBPSK), Differential Quadrature Phase Shift Keying (DQPSK) and Combined Amplitude-Phase Shift (CAPS). PAM4DUO is a format in which a duobinary code is applied to PAM4 to achieve a 7 level signal. In DBPSK, two levels are generated at the transmitter, for example by means of a Mach Zehnder Modulator (MZM), the two levels having same amplitude but opposite phases. In the presence of differential encoding, the transmitted information can be recovered at the receiver by an interferometer, whose arms are delayed each other by a symbol time, placed in front of a balanced photodiode. As expected, DBPSK behaves like OOK (the transmission is binary for both) but with a better back-to-back performance. Combined Amplitude-Phase Shift (CAPS) can be obtained by narrow filtering a DBPSK signal. DQPSK presents the best absolute performance, with the same symbol rate as PAM4 and the distance between adjacent symbols in the constellation is the same as DBPSK. However, complexity is increased, as an In-phase and Quadrature (IQ) modulator is needed at the transmitter, and the receiver requires two interferometers and two balanced photodiodes.

From the above, it can be seen that existing line coding/modulation schemes suffer from various shortcomings, and that one of the schemes offering the best performance is associated with more complex, and therefore expensive, receiver requirements.

SUMMARY

An aspect of the disclosure provides a method of line coding for optical transmission. The method comprises encoding digital data to a set of five line symbols. The line symbols have amplitude values of 0, ±A1, ±A2, where |A2|>|A1|, where a first binary value maps to the line symbols 0 and ±A2, and a second binary value maps to the line symbols ±A1.

At least one example of the present invention has an advantage of relatively simple receiver requirements, as the receiver can determine digital data values using a pair of amplitude thresholds. The complexity (and cost) is similar to PAM4.

At least one example of the present invention has an advantage of requiring about half the optical power of PAM4, and a better tolerance to fiber chromatic dispersion than PAM4.

Optionally, the mapped line symbol depends on a current state of operation of the line coding.

Optionally, the current state of operation of the line coding is changed by the first binary value or the second binary value.

Optionally, the encoding comprises using a state machine with four states, where digital data with the first binary value causes the state machine to remain in the same state.

Optionally, the encoding comprises using a state machine, where digital data with the second binary value causes the state machine to change from state k to state k+1.

Optionally, the encoding comprises using a state machine with four states arranged in a sequence, wherein:

digital data with the first binary value causes the state machine to remain in the same state, where:

in a state 1, digital data with the first binary value causes the state machine to map the digital data to a line symbol with amplitude −A2;

in a state 2, digital data with the first binary value causes the state machine to map the digital data to a line symbol with amplitude 0;

in a state 3, digital data with the first binary value causes the state machine to map the digital data to a line symbol with amplitude +A2;

in a state 4, digital data with the first binary value causes the state machine to map the digital data to a line symbol with amplitude 0;

digital data with the second binary value causes the state machine to move to the next state, where:

in the state 1, digital data with the second binary value causes the state machine to map the digital data to a line symbol with amplitude −A1;

in the state 2, digital data with the second binary value causes the state machine to map the digital data to a line symbol with amplitude +A1;

in the state 3, digital data with the second binary value causes the state machine to map the digital data to a line symbol with amplitude +A1;

in the state 4, digital data with the second binary value causes the state machine to map the digital data to a line symbol with amplitude −A1.

Optionally, the amplitude values of the line symbols are in the ratio $A1:A2=1:\sqrt{2}$.

An aspect of the disclosure provides a method of optical transmission. The method comprises encoding digital data according to the method of any example to produce an encoded signal; and modulating an optical carrier using the encoded signal.

Optionally, the modulating uses a Mach Zehnder Modulator.

An aspect of the disclosure provides a method of receiving an optical signal in which digital data has been encoded to a set of five line symbols. The line symbols have amplitude values of 0, ±A1, ±A2, where |A2|>|A1|, where a first binary value maps to line symbols 0 and ±A2 and a second binary value maps to line symbols ±A1. The method comprising photodetecting the received signal to generate an electrical signal which can represent a set of three possible received symbols; and recovering the digital data from the received symbols.

Optionally, the method comprises recovering the digital data by comparing the electrical signal with a first amplitude threshold and a second amplitude threshold.

Optionally, recovering the digital data from the received symbols comprises determining that the digital data is a first binary value when the electrical signal is less than the first amplitude threshold or above a second amplitude threshold; and determining that the electrical signal is a second binary value when the electrical signal is between the first amplitude threshold and the second amplitude threshold.

An aspect of the disclosure provides a line encoding apparatus for encoding a signal for optical transmission. The apparatus is configured to encode digital data to five line symbols. The line symbols have amplitude values of 0, ±A1, ±A2, where |A2|>|A1|, wherein the apparatus is configured to map a first binary value to the line symbols 0 and ±A2, and map a second binary value to the line symbols ±A1.

Optionally, the mapped line symbol depends on a current state of operation of the line coding.

Optionally, the line encoding apparatus is configured to change a current state of operation of the line coding on receiving the first binary value or the second binary value.

Optionally, the line encoding apparatus is configured to encode as a state machine with four states, where digital data with the first binary value causes the state machine to remain in the same state.

Optionally, the encoding comprises using a state machine, where digital data with the second binary value causes the state machine to change from state k to state k+1.

An aspect of the disclosure provides a line encoding apparatus according to any example, which is configured to perform the method of any example.

An aspect of the disclosure provides an optical transmitter comprising a line encoding apparatus according to any example. which is configured to output an encoded signal. The transmitter further comprises an optical modulator which is configured to modulate an optical carrier using the encoded signal to output a modulated optical carrier.

An aspect of the disclosure provides an optical receiver comprising a photodetection stage which is configured to receive an optical signal and to output an electrical signal. The optical signal carries digital data which has been encoded to a set of five line symbols. The line symbols have amplitude values of zero, ±A1, ±A2, where |A2|>|A1|, where a first binary value is mapped to line symbols 0 and ±A2 and a second binary value is mapped to line symbols ±A1, and where the electrical signal can represent a set of three possible received symbols. The receiver comprises a digital data recovery stage which is configured to recover the digital data from the received symbols.

Optionally, the optical receiver is configured to recover the digital data by comparing the electrical signal with a first amplitude threshold and a second amplitude threshold.

Optionally, the digital data recovery stage is configured to determine that the digital data is a first binary value when the electrical signal is less than the first amplitude threshold or above the second threshold; and determine that the electrical signal is a second binary value when the electrical signal is between the first amplitude threshold and the second amplitude threshold.

An aspect of the disclosure provides a line encoding apparatus for encoding a signal for optical transmission. The apparatus comprising a receiving unit configured to receive digital data; and a state unit configured to determine an operational state of the line encoding apparatus. The apparatus further comprises an encoding unit configured to map the received digital data to five line symbols. The line symbols have amplitude values of 0, ±A1, ±A2, where |A2|>|A1|, and the encoding unit is configured to map a first binary value to the line symbols 0 and ±A2; and map a second binary value to the line symbols ±A1.

An aspect of the disclosure provides a line encoding apparatus for encoding a signal for optical transmission. The line encoding apparatus comprising processing circuitry, the processing circuitry being configured to cause the line encoding apparatus to encode digital data to a set of five line symbols. The line symbols have amplitude values of 0, ±A1, ±A2, where |A2|>|A1|, where a first binary value maps to the line symbols 0 and ±A2; and a second binary value maps to the line symbols ±A1.

An aspect of the disclosure provides a computer program for encoding a signal for optical transmission. The computer program comprising computer code which, when run on processing circuitry of a line encoding apparatus, causes the line encoding apparatus to encode digital data to a set of five line symbols. The line symbols have amplitude values of 0, ±A1, ±A2, where |A2|>|A1|, where a first binary value maps to the line symbols 0 and ±A2; and a second binary value maps to the line symbols ±A1.

An aspect of the disclosure provides a computer program product comprising a computer program according to an example, and a computer readable storage medium on which the computer program is stored.

BRIEF DESCRIPTION OF THE DRAWINGS

Embodiments of the invention will be described, by way of example only, with reference to the accompanying drawings in which.

DETAILED DESCRIPTION

Figure 2:
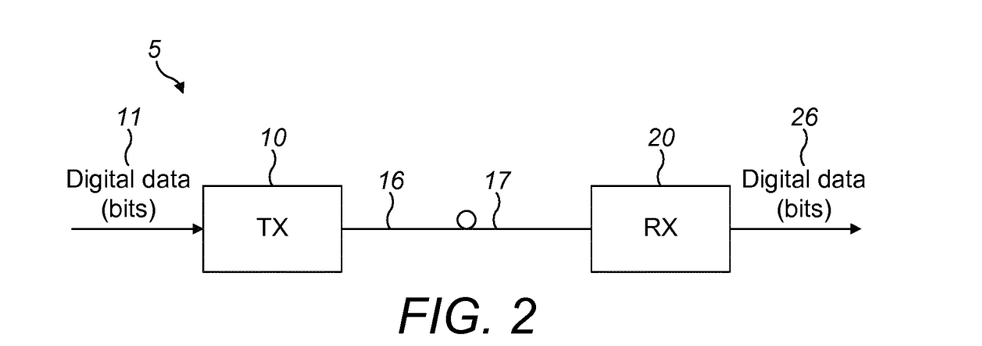
FIG. 2 shows an optical transmission system.

FIG. 2 shows an example of an optical transmission system 5 comprising an optical transmitter 10 and an optical receiver 20 connected by an optical fiber 17. The optical transmission system 5 can form part of an access network, an aggregation network or some other communications network. The optical transmitter 10 receives digital data 11 and outputs an optical signal 16 which is line coded and modulated with the digital data. The optical receiver 20 receives the optical signal 16, retrieves the digital data, and outputs the digital data 26.

Figure 3:
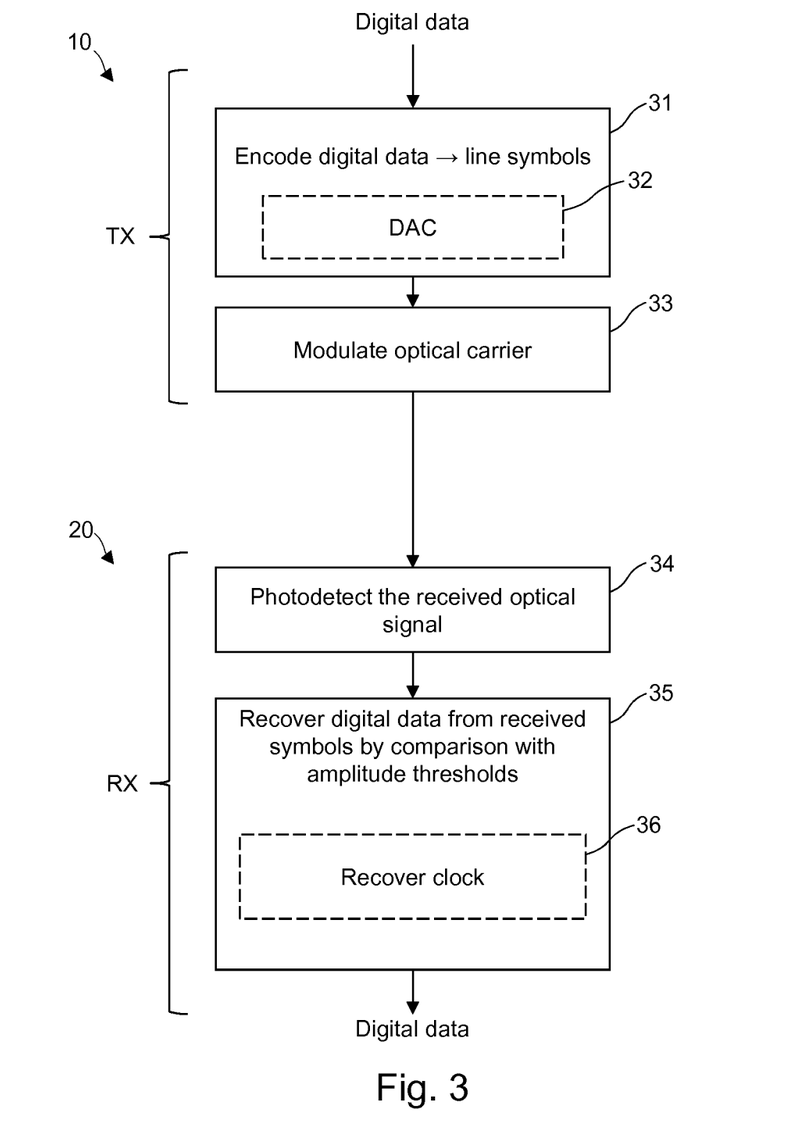
FIG. 3 shows a method performed at an optical transmitter and an optical receiver of the optical transmission system.

FIG. 3 shows an overview of a method performed by the optical transmitter 10 and the optical receiver 20. The transmitter 10 receives binary digital data and, at block 31, encodes the digital data to a set of line symbols. There is a set of five line symbols. The line symbols have the amplitude values: 0, ±A1, ±A2, where |A2|>|A1|. Arranged in order of increasing amplitude, the line symbols are {−A2, −A1, 0, +A1, +A2}. A first binary value (e.g. a binary '0') maps to the line symbols 0 and ±A2. A second binary value (e.g. a binary '1') maps to the line symbols ±A1. The encoding process outputs a multi-level signal. The encoding process may use digital-to-analog conversion 32 to generate the multi-level signal. At block 33 an optical carrier is modulated with the multi-level signal.

If a modulator with a linear input-output relationship is used at block 33, the encoding process at block 31 can map binary data directly to the set of line symbol values {−A2, −A1, 0, A1, A2} of the modulated optical signal. If a modulator with a non-linear input-output relationship (transfer function) is used at block 33, the encoding process at block 31 can map binary data to a set of intermediate values which, when applied to the non-linear modulator at block 33, correspond to the set of line symbol values {−A2, −A1, 0, A1, A2}. For example, if the non-linear modulator requires the set of inputs {0, 0.5, 1, 1.5, 2} to map to the set of line symbols {−√2, −1, 0, +1, +√2}, the encoding process maps binary data to a set of values which gives those inputs.

The receiver 20 receives the modulated optical signal. At block 34, the receiver performs photodetection of the received optical signal. That is, the receiver converts the optical signal to an electrical signal. At block 35, the receiver recovers digital data from the received symbols. This block uses amplitude thresholds. The electrical signal is compared with thresholds to determine the original digital data binary value corresponding to the electrical signal. Optionally, at block 36, the receiver may determine a clock from the received signal for use in decoding digital data. The clock can be used to determine the times at which the received signal is compared with the thresholds TH1, TH2.

Figure 4:
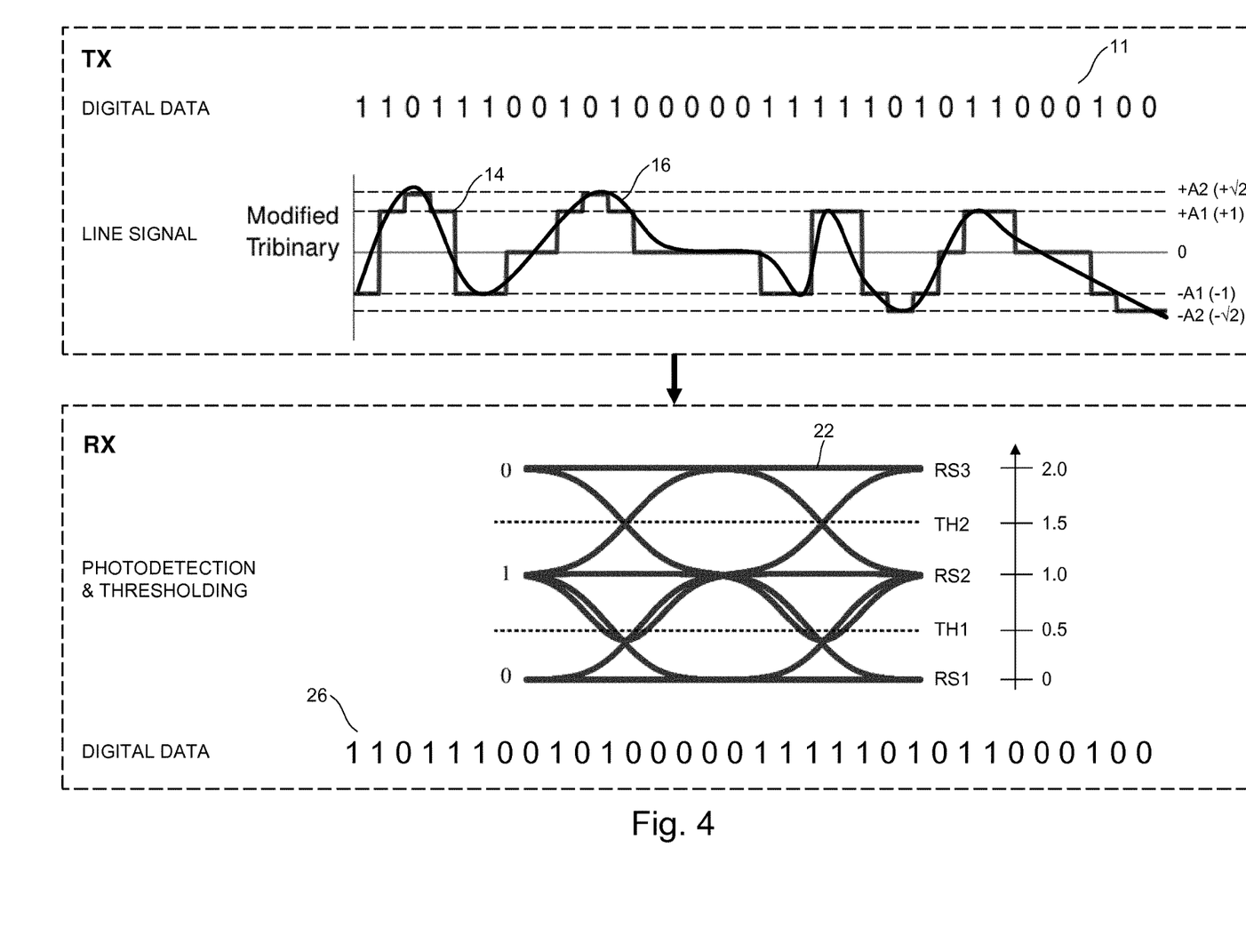
FIG. 4 shows signals at an optical transmitter and an optical receiver.

FIG. 4 shows signals at different stages of the transmission. Binary digital data 11 having values of '0' and '1' is encoded to one of a set of five line symbols. The five line symbols have values of one of: −A2, −A1, 0, +A1, +A2. An example line signal 16 generated from the line symbols is shown, e.g. by smoothing or a further operation. In this example, the values of the line symbols are related by the ratio A1:A2=1:√2. The line signal in FIG. 4 has the amplitude values A1=1 and A2=√2. The line encoded signal transitions between the set of five line symbols. The line encoding maps a first binary value (e.g. binary '0') to the line symbols 0 and ±A2. The line encoding maps a second binary value (e.g. binary '1') to the line symbols ±A1. An advantage of these values will be apparent when describing the receiver.

Signal 14 is a multi-level signal output or generated by the encoder. As for conventional OOK binary signals, the signal 14 may be low-pass filtered to smooth the transitions between the line symbols. An optical carrier is modulated using the signal 14, or a low-pass filtered version of signal 14. FIG. 4 assumes the modulator is linear. If a non-linear modulator is used, the multi-level signal 14 has a set of values which, when applied to the non-linear modulator, correspond to the set of line symbol values {−√2, −1, 0, +1, +√2}.

FIG. 4 shows an eye diagram 22 of the optical signal, after photo-detection. The five line symbols of the transmitted signal: −A2, −A1, 0, ±A1, ±A2 correspond to three received symbols: RS1, RS2, RS3. The relationship between line symbols, received symbols and binary data values is:

−A2, +A2→RS3→binary 0
−A1, +A1→RS2→binary 1
0→RS1→binary 0

The relationship between line symbols and received symbols is due to the photo-detection process, which considers optical intensity (power) of the received signal. The photo-detector outputs a current proportional to the input optical power, which is the square of the absolute value of the input electrical field in the optical fiber. Therefore, the line symbols +A1 and −A1, after photo-detection, correspond to the same received symbol RS2, and the line symbols +A2 and −A2, after photodetection, correspond to the same received symbol RS3. For the receiver, three symbols are detected. The binary digital data can be recovered by comparing the electrical signal 22 sampled at a sampling point (where the sample amplitude=x) with a first amplitude threshold TH1 and a second amplitude threshold TH2. In this example, the thresholds are set mid-way between the expected values of the received symbols RS1, RS2, RS3. A scale of normalised amplitude values is provided alongside the eye diagram. With RS1=0, RS2=1.0 and RS3=2.0, the thresholds are TH1=0.5 and TH2=1.5. A received signal is determined to be a binary 1 if the sampled signal falls in the range 0.5<x<1.5, and a binary 0 if 0≤x≤0.5, or if 1.5≤x≤2.0.

Figure 5:
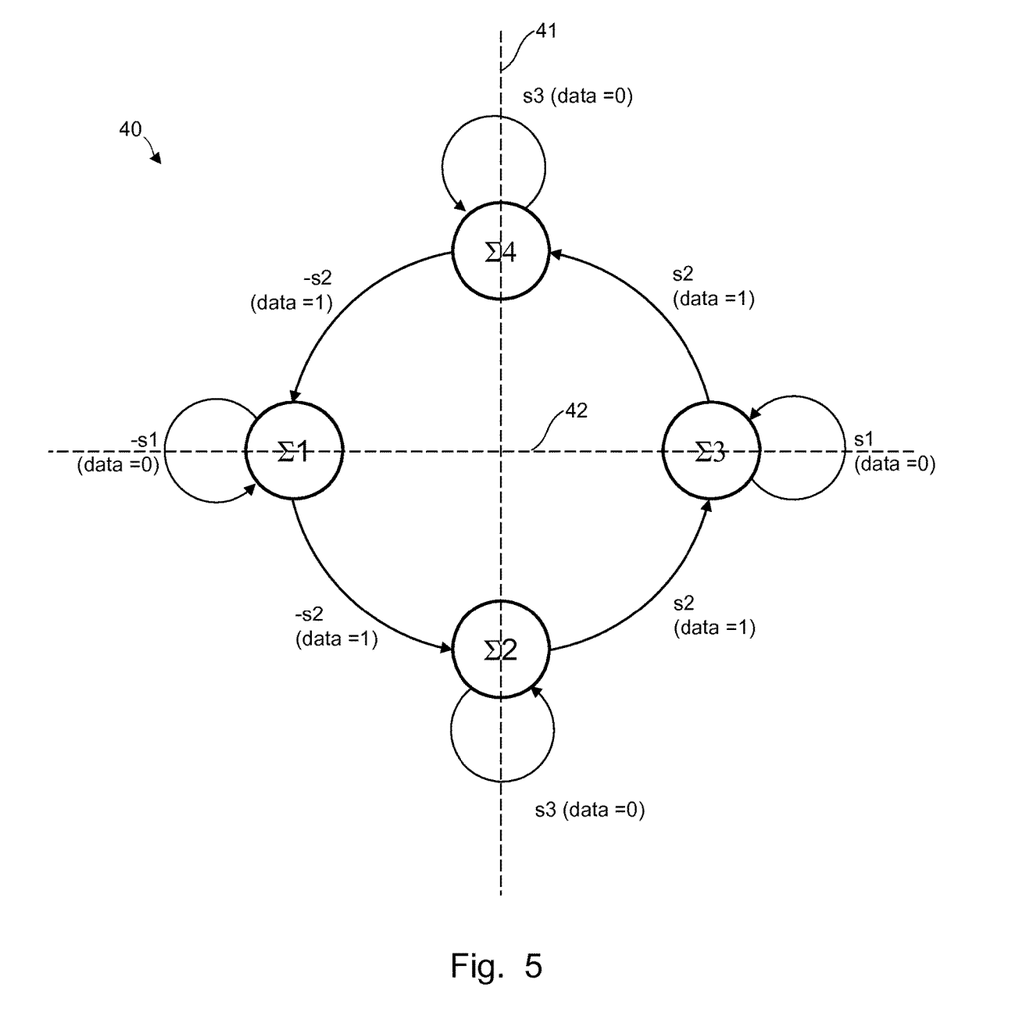
FIG. 5 shows signal transitions and a state machine which can be used in the optical transmitter.

FIG. 5 shows a state machine 40 which is used to map binary digital data to a set of line symbols. The data maps to a line symbol according to a current state of the state machine. The line encoding apparatus may be considered as operating as a state machine. The line encoding apparatus may be considered as operating in one of the states of the state machine 40 to generate a line symbol value from the input digital data, the selected line symbol value depending on the current operating state. The upper part of FIG. 5 shows a set of signal transitions: s1(t), s2(t), s3(t). The state machine 40 has four states: Σ1, Σ2, Σ3, Σ4 arranged in a continuous sequence. The state machine operates on a bit-by-bit basis. The signal transitions: s1(t), s2(t), s3(t) are shown with amplitude values 0, A1, A2. In some aspects, the upper part of FIG. 5 shows the relative amplitudes of the line symbol values, i.e. A2=√2, A1=1 and zero. As explained above, if a non-linear modulator is used, the set of values is modified to values which, when applied to the non-linear modulator, correspond to the set of line symbol values {−A2, −A1, 0, ±A1, ±A2}.

The operating state of the state machine is changed by one of the input data values. In some aspects, the line encoding apparatus is configured to change a current state of operation of the line coding on receiving the first binary value or the second binary value. The operating state of the state machine is not changed by the other of the input data values. For example, binary digital data with the first binary value (e.g. binary '0') causes the state machine to remain in the same state. Binary digital data with the second binary value (e.g. binary '1') causes the state machine to change from state k to state k+1. The state machine cycles around the discrete number of operating states (e.g. four). For example, for a state machine with four states, an advance of the state causes the state machine to change from state k to state k+1 mod(4). The state machine is symmetrical. That is, the pattern of states, and of operations of the state machine, is symmetrical about lines 41 and 42. The amplitude values of the line symbols mapped when changing state from state 4 to state 1 and from state 1 to state 2 are equal. The amplitude values of the line symbols mapped when changing state from state 2 to state 3 and from state 3 to state 4 are equal, and opposite to the amplitude values of the line symbols mapped when changing state from state 4 to state 1 and from state 1 to state 2.

In some aspects, the mapped line symbol depends on a current state of operation of the line coding. The current state of operation of the line coding is changed by the first binary value or the second binary value. The mapped line symbol depends on a current state of the line coding. The state of the line coding (i.e. on the state machine) is changed by one or more values of the data which is being mapped to the line symbols. References to implementation by a state machine may indicate an encoder, transmitter or line encoding apparatus configured to operate according to a state machine, i.e. output depends on a current operational state.

Binary digital data with one of the values, e.g. the first binary value (e.g. binary 0) causes the state machine to remain in the same state, where:
  in state 1, digital data with the first binary value causes the state machine to map the digital data to a line symbol with amplitude −A2;
  in state 2, digital data with the first binary value causes the state machine to map the digital data to a line symbol with amplitude 0;
  in state 3, digital data with the first binary value causes the state machine to map the digital data to a line symbol with amplitude +A2;
  in state 4, digital data with the first binary value causes the state machine to map the digital data to a line symbol with amplitude 0;

Binary digital data with the other of the values, e.g. second binary value (e.g. binary 1) causes the state machine to move to the next state, where:
  in state 1, digital data with the second binary value causes the state machine to map the digital data to a line symbol with amplitude −A1;
  in state 2, digital data with the second binary value causes the state machine to map the digital data to a line symbol with amplitude +A1;
  in state 3, digital data with the second binary value causes the state machine to map the digital data to a line symbol with amplitude +A1;
  in state 4, digital data with the second binary value causes the state machine to map the digital data to a line symbol with amplitude −A1.

As such, the determined line symbol (e.g. one of the set {−A2, −A1, 0, +A1, +A2}) is based on both the input binary value (e.g. 0 or 1) and the current state of operation of the encoder or method, e.g. in state 1, 2, 3 or 4.

Figure 6:
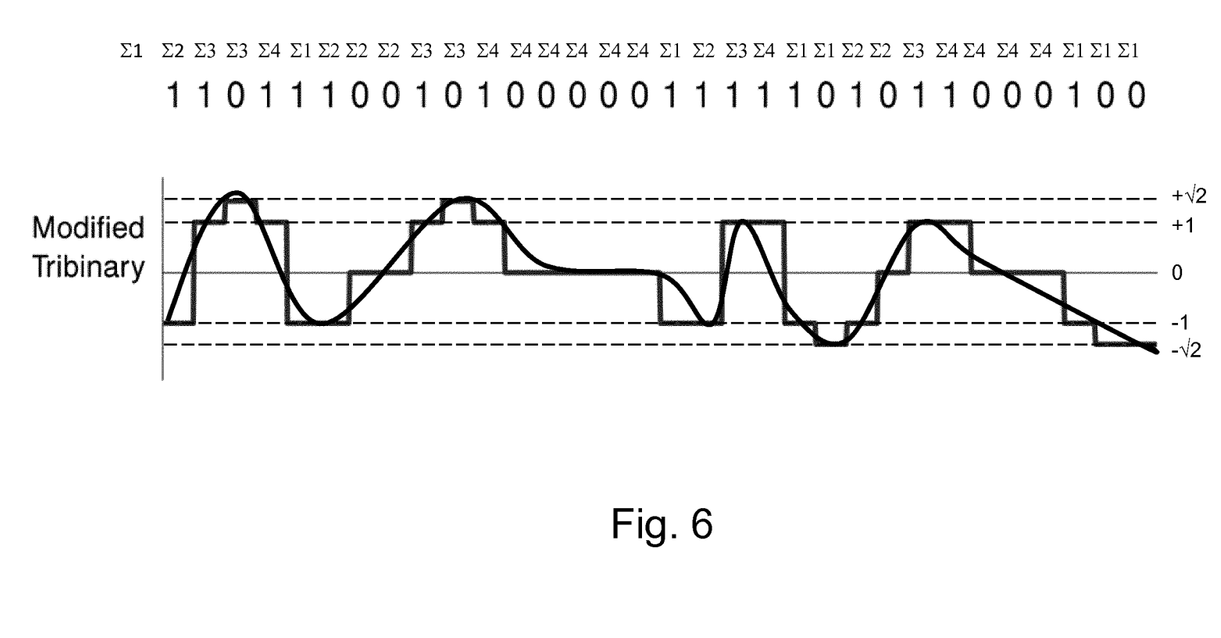
FIG. 6 shows an example sequence of digital data with states of the state machine and a multi-level signal corresponding to the digital data.

For completeness, FIG. 6 shows the sequence of states (labelled as states Σ1, Σ2, Σ3, Σ4) corresponding to a sequence of binary digital data (e.g. 1 1 0 1 1 1 0 . . . ). The state machine begins in state Σ1. The next binary data=1 and the state machine performs a transition −s2(t) to a line symbol with amplitude −A1 and moves to state 2. The next binary data=1 and the state machine performs a transition s2(t) to a line symbol with amplitude +A1 and moves to state 3. The next binary data=0 and the state machine performs a transition s1(t) to a line symbol with amplitude +A2 and remains in state 3. The process continues through the sequence of states and transitions between line symbols as shown in FIG. 6.

Figure 7:
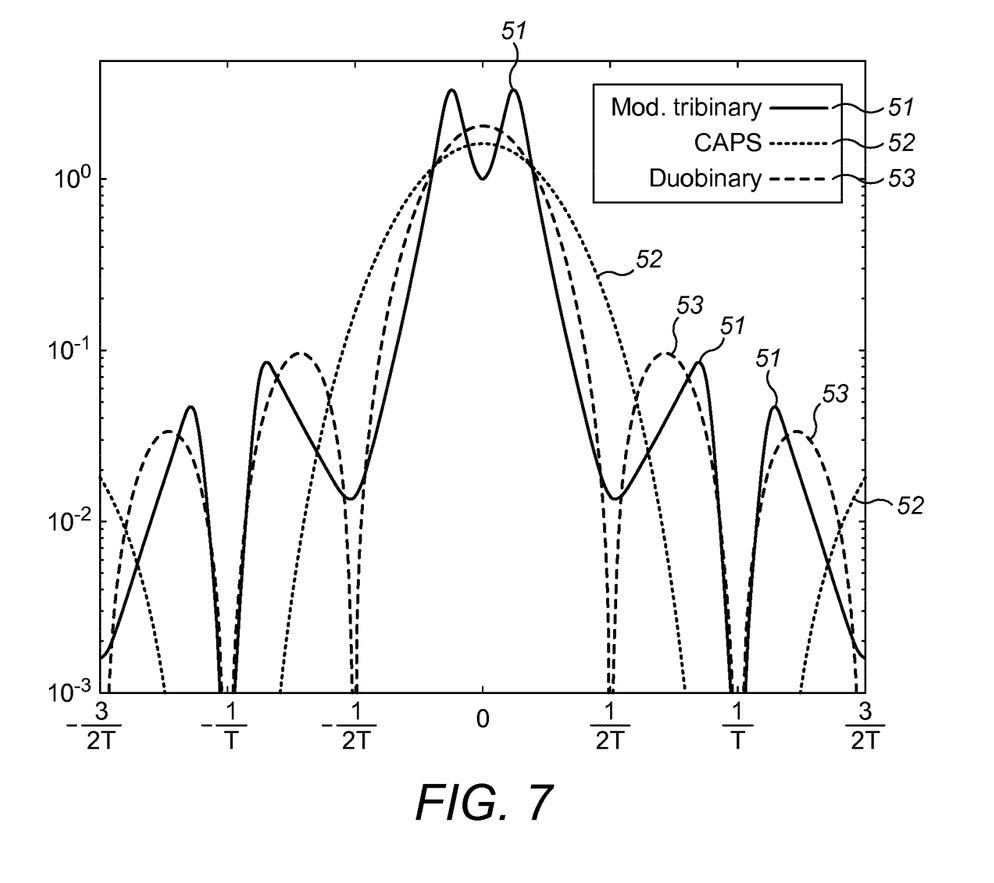
FIG. 7 shows a spectrum of an optical signal modulated with a signal encoded using the above format.

FIG. 7 shows the spectrum of the transmitted signal 51 according to an example of the disclosure, plotted as power spectral density against frequency, where T is the duration of a bit period of the transmitted signal. Spectra of a CAP signal 52 and a duobinary signal 53 are also shown for comparison. It can be seen that the transmitted signal 51 has enhanced energy concentration around the lowest frequencies.

Figure 8:
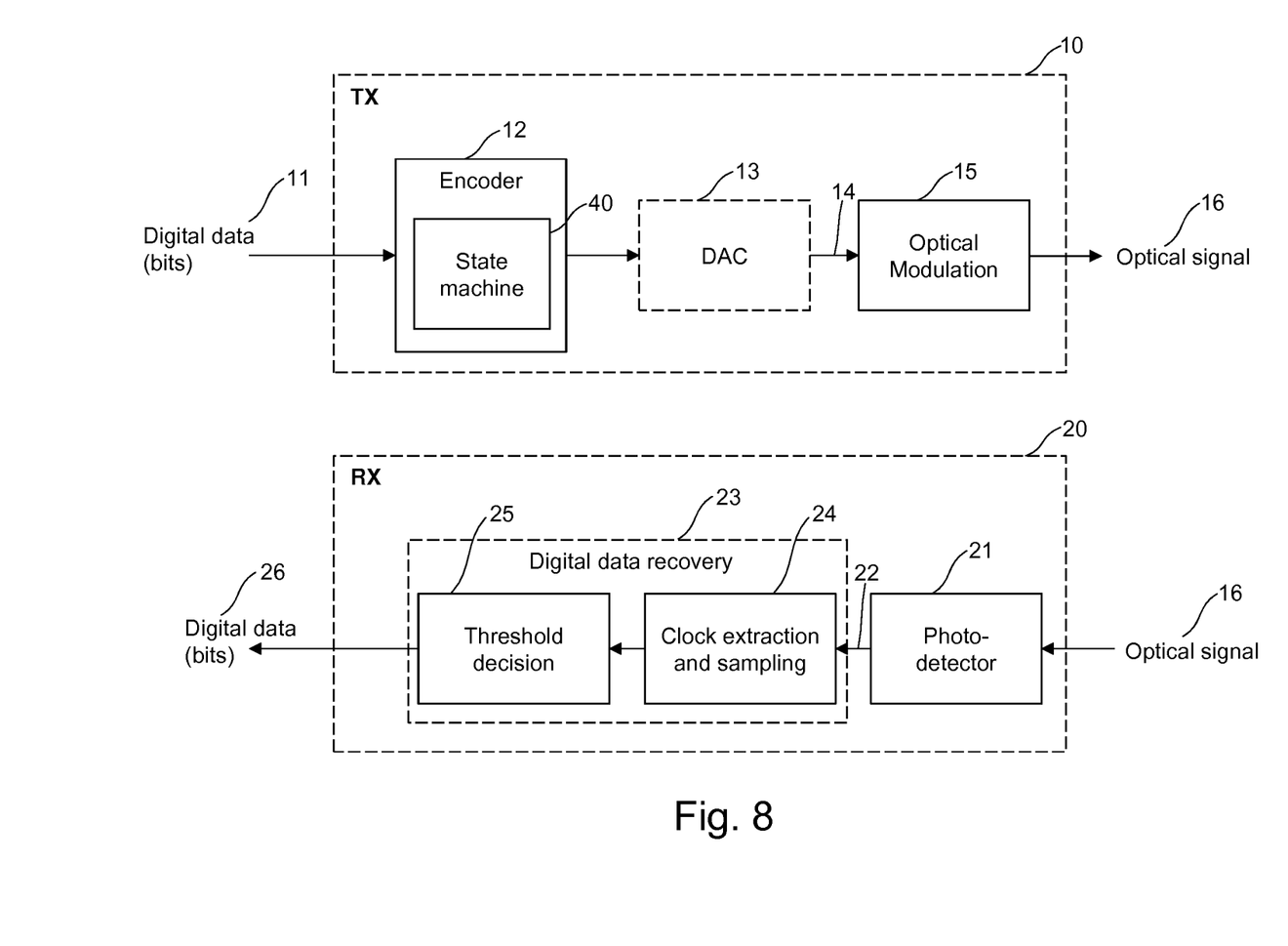
FIG. 8 shows apparatus at an optical transmitter and an optical receiver.

FIG. 8 shows apparatus at an optical transmitter 10 and an optical receiver 20. The optical transmitter 10 has an input to receive digital data. The optical transmitter 10 comprises an encoder 12 (also referred to as a line encoding apparatus) which maps binary digital data to line symbols. The encoder 12 can comprise, or be considered to operate as, a state machine 40 as previously described. The encoder 12 may directly output analog signals at amplitudes corresponding to the set of line symbols (i.e. −A2, −A1, 0, +A1, +A2). The encoder 12 is for encoding a signal for transmission, e.g. optical transmission. Alternatively, the encoder 12 may indicate, for each operation of the state machine, a line symbol required. For example, each of the five line symbols can correspond to a digital code which is used internally by the transmitter. A digital-to-analog converter (DAC) 13 outputs an analog value, corresponding to the digital code of the required line symbol. The output of the encoder, or DAC 13 (if used), is a multi-level analog signal 14 (e.g. 14, FIG. 4). Optionally, a low pass filter may be included in the transmitter 10 to low pass filter the signal. Alternatively, a low-pass filtering effect is provided by the limited bandwidth of the modulator. The analog signal is used to modulate an optical carrier in an optical modulation stage 15 (e.g. Mach Zehnder Modulator) and output a modulated optical signal 16.

The receiver 20 has an input to receive a modulated optical signal 16. The receiver 20 comprises a photodetection stage 21 which is configured to receive an optical signal and to output an electrical signal 22. As described above, the photodetection stage 21 outputs an electrical signal which is proportional to power of the received optical signal. The photodetection stage may include an electrical amplifier (e.g. a transimpedance amplifier). The electrical signal can represent a set of three possible received symbols. A digital data recovery stage 23 is configured to recover digital data from the received symbols. The digital data recovery stage 23 comprises a threshold decision unit 25 which is configured to compare the electrical signal with a first amplitude threshold TH1 and a second amplitude threshold TH2. This can operate as shown in the lower part of FIG. 4. The digital data recovery stage 23 can also comprise a clock extraction and sampling unit 24 which is configured to extract a clock signal from the detected electrical signal and to sample the detected electrical signal at points in time determined by the extracted clock. Referring again to the lower part of FIG. 4, the threshold decision unit 25 is configured to determine that the digital data is a first binary value when the electrical signal 22 is less than the first amplitude threshold TH1 or above the second amplitude threshold TH2. The threshold decision unit 25 is configured to determine that the electrical signal is a second binary value when the electrical signal is between the first amplitude threshold TH1 and the second amplitude threshold TH2. The determined symbol value is output as digital data 26, corresponding to the transmitted digital data 11.

Referring again to FIG. 1, a modified tribinary (MOD-TRIBIN) signal of the type described above is shown alongside other signal formats in the graph of sensitivity penalty (with respect to OOK) versus fiber length (for a chromatic dispersion coefficient of 15.7 ps/nm/km) for a 50 Gbit/s channel for a range of modulation/line coding formats. The modified tribinary (MOD-TRIBIN) signal is comparable in complexity to PAM4 while its back-to-back performance is 3 dB better. The modified tribinary signal behaves like a DQPSK signal over a range of fiber lengths.

Figure 9:
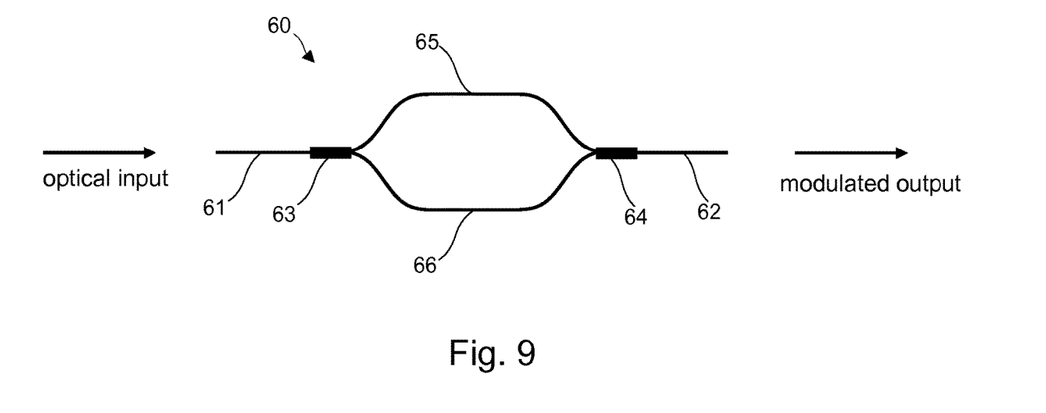
FIG. 9 shows a Mach Zehnder Modulator which can be used in the optical transmitter.

FIG. 9 shows a Mach Zehnder Modulator (MZM) 60 which can be used in the optical modulation stage 15 of the optical transmitter 10 of FIG. 8. The MZM 60 has an input port 61 and an output port 62. Optical radiation from a suitable source (e.g. a laser) is applied to the input port 61. The MZM has two waveguides 65, 66, called arms. A splitter 63 connects the input 61 to the two arms 65, 66. A combiner 64 connects the two arms 65, 66 to the output 62. The optical field amplitude at the output of the MZM 60 can be represented by the equation:

$$A_{out} = \frac{\sqrt{2}}{2}(B_1 e^{j\Phi_1} + B_2 e^{j\Phi_2})$$

where $B_1$ and $B_2$ represent optical amplitudes in the two arms 65, 66, and $\phi_1$, $\phi_2$ represent the optical phase delays. For explanatory purposes, we can consider:

$$B_1 = B_2 = 1$$

$$\phi_1 = -\phi_2 = \phi$$

Giving:

$$A_{out} = \sqrt{2} * \cos(\pi/2 * V/V_\pi)$$

where:
V is the applied voltage to the MZM;
$V_\pi$ is the voltage value at which the voltage-induced phase difference reaches $\pi$ (180°).

Hence:

$$A_{out} = \sqrt{2} \text{ for } V=0 (=A2)$$

$$A_{out} = 1 \text{ for } V=V_\pi/2 (=A1)$$

$$A_{out} = 0 \text{ for } V=V_\pi$$

$$A_{out} = -1 \text{ for } V=3/2*V_\pi (=-A1)$$

$$A_{out} = -\sqrt{2} \text{ for } V=2V_\pi (=-A2)$$

Figure 10:
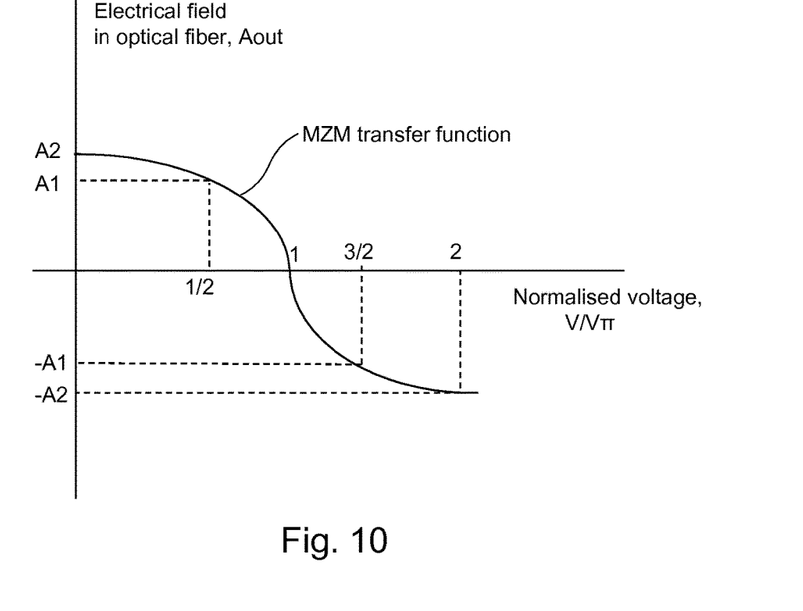
FIG. 10 shows an example of a transfer function of the Mach Zehnder Modulator.

FIG. 10 shows a plot of the MZM transfer function, showing electrical field in the optical fiber ($A_{out}$) against normalised voltage $V/V_\pi$. This is an example of a modulator with a non-linear input-output transfer function. The values are normalized to the square root of the transmitted optical power. The modulator requires the set of inputs $V/V_\pi = \{0, 0.5, 1, 1.5, 2\}$ to map to the set of line symbols $\{A2, A1, 0, -A1, -A2\}$.

The relationship between inputs and outputs shown in FIG. 10 is one possible example. Other relationships are possible by use of a bias voltage at the MZM. The bias voltage has the effect of shifting the MZM transfer function along the x-axis in FIG. 10.

At least some of the functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

Figure 11:
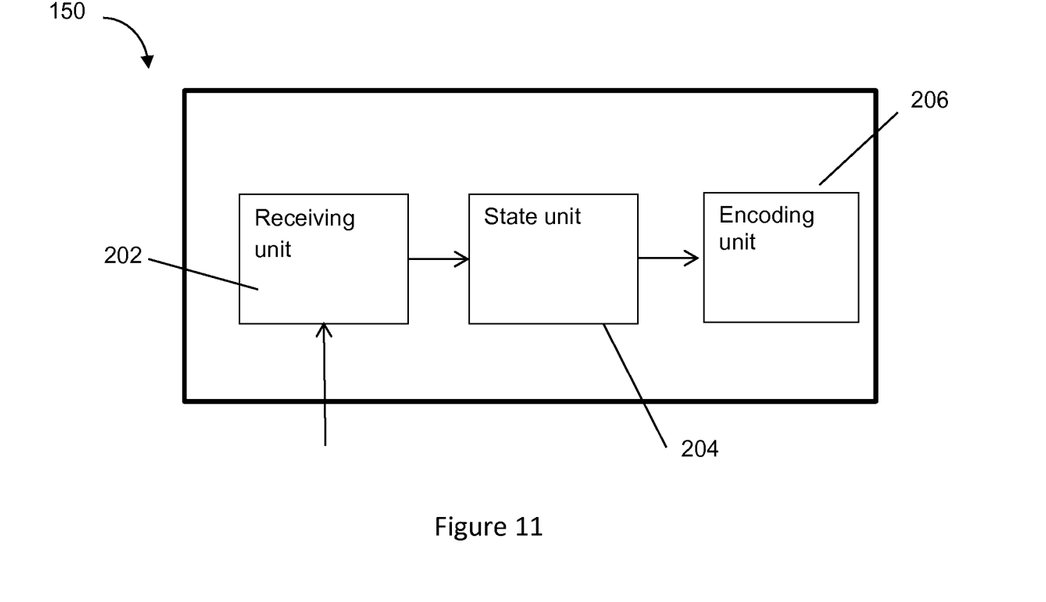
FIG. 11 shows an example of the line encoding apparatus.

FIG. 11 shows an example of a line encoding apparatus, transmitter or encoder 150, corresponding to the encoder 12. A receiving unit 202 is configured to receive the digital data. A state unit 204 is configured to determine a state of the encoder, i.e. a state of operation of the encoder operating as a state machine. An encoding unit 206 is configured to receive the state and the digital data to be encoded. The encoding unit 206 determines the symbol value according to the method and values as described above.

The units or modules described may be implemented in software, firmware or hardware. A description of a separate unit does not indicate a separate implementation, one or more units may be implemented by the same software, firmware or hardware.

Figure 12:
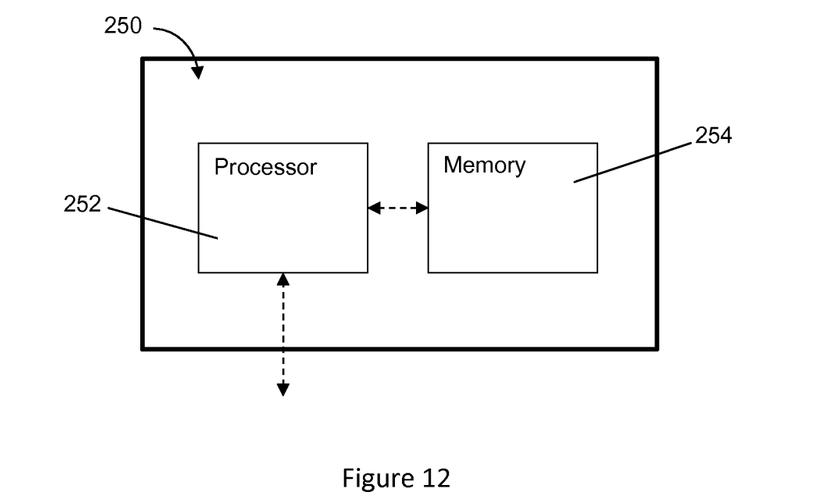
FIG. 12 shows a further example of the line encoding apparatus.

FIG. 12 shows a further example of a line encoding apparatus, transmitter or encoder 250 providing the line encoding apparatus or encoder 12. The control entity 250 comprises a processor or processing circuitry 252 and a memory or storage medium 254. The memory contains instructions executable by the processor, whereby the control entity is operative to implement the method described in any example.

In some aspects, the memory contains instructions executable by the processor, whereby the control entity is operative to implement any example of the disclosure.

In an embodiment, the receiving unit 202, state unit 204 and the encoding unit 206 described above are implemented as a computer program running on the processor 252.

In some examples, the computer program is for encoding a signal for optical transmission. The computer program comprising computer code which, when run on processing circuitry 252 of a line encoding apparatus, causes the line encoding apparatus to encode 31 digital data to a set of five line symbols; where the line symbols have amplitude values of 0, ±A1, ±A2, where |A2|>|A1|, where: a first binary value maps to the line symbols 0 and ±A2; and a second binary value maps to the line symbols ±A1. In further examples, the computer program is arranged to carry out the functions of any example.

In some examples, the processor or processing circuitry is provided using any combination of one or more of a suitable central processing unit (CPU), multiprocessor, microcontroller, digital signal processor (DSP), etc., capable of executing software instructions stored in a computer program product, e.g. in the form of the storage medium 254. The processing circuitry may further be provided as at least one application specific integrated circuit (ASIC), or field programmable gate array (FPGA).

In some examples, the processing circuitry 252 is configured to cause the line encoding apparatus to perform a set of operations as disclosed above. For example, the storage medium 254 may store the set of operations, and the processing circuitry 252 may be configured to retrieve the set of operations from the storage medium 254 to cause the line encoding apparatus 250 to perform the set of operations. The set of operations may be provided as a set of executable instructions. Thus the processing circuitry 252 is thereby arranged to execute methods as herein disclosed.

The storage medium 254 may also comprise persistent storage, which, for example, can be any single one or combination of magnetic memory, optical memory, solid state memory or even remotely mounted memory.

In some examples, the processing circuitry 252 includes or is connected to the DAC 13, and may be functionally connected to the optical modulation stage 15.

The steps of the methods described herein may be carried out in any suitable order, or simultaneously where appropriate.

Examples of the disclosure have been described as relating to optical transmission or optical receiving. Alternatively, the examples may also be considered to relate to electrical transmission or receiving. The line symbol values and state machine operation are also suitable for generation of symbols for electrical transmission.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure.

The invention claimed is:

1. A method of line coding for optical transmission comprising:
   encoding digital data to a set of five line symbols;
   where the line symbols have amplitude values of 0, ±A1, ±A2, where |A2|>|A1|, where:
      a first binary value maps to the line symbols 0 and ±A2;
      a second binary value maps to the line symbols ±A1.

2. A method according to claim 1 wherein the mapped line symbol depends on a current state of operation of the line coding.

3. A method according to claim 1 wherein the current state of operation of the line coding is changed by the first binary value or the second binary value.

4. A method according to claim 1 wherein the encoding comprises using a state machine with four states, where digital data with the first binary value causes the state machine to remain in the same state.

5. A method according to claim 1 where the encoding comprises using a state machine, where digital data with the second binary value causes the state machine to change from state k to state k+1.

6. A method according to claim 1 where the encoding comprises using a state machine with four states arranged in a sequence, wherein:
   digital data with the first binary value causes the state machine to remain in the same state, where:
      in a state 1, digital data with the first binary value causes the state machine to map the digital data to a line symbol with amplitude −A2;
      in a state 2, digital data with the first binary value causes the state machine to map the digital data to a line symbol with amplitude 0;
      in a state 3, digital data with the first binary value causes the state machine to map the digital data to a line symbol with amplitude +A2;
      in a state 4, digital data with the first binary value causes the state machine to map the digital data to a line symbol with amplitude 0;
   digital data with the second binary value causes the state machine to move to the next state, where:
      in the state 1, digital data with the second binary value causes the state machine to map the digital data to a line symbol with amplitude −A1;
      in the state 2, digital data with the second binary value causes the state machine to map the digital data to a line symbol with amplitude +A1;
      in the state 3, digital data with the second binary value causes the state machine to map the digital data to a line symbol with amplitude +A1;
      in the state 4, digital data with the second binary value causes the state machine to map the digital data to a line symbol with amplitude −A1.

7. A method according to claim 1 wherein the amplitude values of the line symbols are in the ratio $A1:A2=1:\sqrt{2}$.

8. A method of optical transmission comprising:
encoding digital data according to the method of claim 1 to produce an encoded signal; and
modulating an optical carrier using the encoded signal.

9. A method according to claim 8 wherein the modulating uses a Mach Zehnder Modulator.

10. A method of receiving an optical signal in which digital data has been encoded to a set of five line symbols, where the line symbols have amplitude values of 0, ±A1, ±A2, where |A2|>|A1|, where a first binary value maps to line symbols 0 and ±A2 and a second binary value maps to line symbols ±A1, the method comprising:
photodetecting the received signal to generate an electrical signal which can represent a set of three possible received symbols;
recovering the digital data from the received symbols.

11. The method as claimed in claim 10 comprising recovering the digital data by comparing the electrical signal with a first amplitude threshold and a second amplitude threshold.

12. A method according to claim 10 wherein recovering the digital data from the received symbols comprises:
determining that the digital data is a first binary value when the electrical signal is less than the first amplitude threshold or above a second amplitude threshold;
determining that the electrical signal is a second binary value when the electrical signal is between the first amplitude threshold and the second amplitude threshold.

13. A line encoding apparatus for encoding a signal for optical transmission, the line encoding apparatus comprising processing circuitry, the processing circuit being configured to cause the line encoding apparatus to configured to:
encode digital data to five line symbols;
where the line symbols have amplitude values of 0, ±A1, ±A2, where |A2|>|A1|, wherein the apparatus is configured to map:
a first binary value to the line symbols 0 and ±A2;
a second binary value to the line symbols ±A1.

14. A line encoding apparatus according to claim 13 wherein the mapped line symbol depends on a current state of operation of the line coding.

15. A line encoding apparatus according to claim 13 wherein the processing circuitry is configured to cause the line encoding apparatus to change a current state of operation of the line coding on receiving the first binary value or the second binary value.

16. A line encoding apparatus according to claim 13 wherein the processing circuitry is configured to cause the line encoding apparatus to encode as a state machine with four states, where digital data with the first binary value causes the state machine to remain in the same state.

17. A line encoding apparatus according to any claim 13 where the encoding comprises using a state machine, where digital data with the second binary value causes the state machine to change from state k to state k+1.

18. An optical transmitter comprising:
a line encoding apparatus according to claim 13 which is configured to output an encoded signal; and
an optical modulator which is configured to modulate an optical carrier using the encoded signal to output a modulated optical carrier.

19. An optical receiver comprising:
a photodetection stage which is configured to receive an optical signal and to output an electrical signal, wherein the optical signal carries digital data which has been encoded to a set of five line symbols, where the line symbols have amplitude values of zero, ±A1, ±A2, where |A2|>|A1|, where a first binary value is mapped to line symbols 0 and ±A2 and a second binary value is mapped to line symbols ±A1, and where the electrical signal can represent a set of three possible received symbols;
a digital data recovery stage which is configured to recover the digital data from the received symbols.

20. The optical receiver as claimed in claim 19, wherein the optical receiver is configured to recover the digital data by comparing the electrical signal with a first amplitude threshold and a second amplitude threshold.

21. An optical receiver according to claim 19 wherein the digital data recovery stage is configured to:
determine that the digital data is a first binary value when the electrical signal is less than the first amplitude threshold or above the second threshold;
determine that the electrical signal is a second binary value when the electrical signal is between the first amplitude threshold and the second amplitude threshold.

* * * * *